(12) United States Patent
Yang et al.

(10) Patent No.: US 6,884,292 B2
(45) Date of Patent: Apr. 26, 2005

(54) OPTICAL LENS COATING APPARATUS AND METHOD

(75) Inventors: Zhou Yang, Milford, CT (US); Yinghui Wu, Milford, CT (US)

(73) Assignee: Optima, Inc., Stratford, CT (US)

( * ) Notice: Subject to any disclaimer, the term of this patent is extended or adjusted under 35 U.S.C. 154(b) by 486 days.

(21) Appl. No.: 10/059,705

(22) Filed: Jan. 29, 2002

(65) Prior Publication Data

US 2002/0086103 A1 Jul. 4, 2002

Related U.S. Application Data

(62) Division of application No. 09/656,982, filed on Sep. 6, 2000, now Pat. No. 6,387,441.

(51) Int. Cl.[7] ............................................. B05C 13/00
(52) U.S. Cl. ...................................... 118/500; 118/501
(58) Field of Search .............................. 118/423, 500, 118/501, 400; 134/66, 76, 82, 142, 901; 414/331.08, 331.13; 269/45, 46, 58

(56) References Cited

U.S. PATENT DOCUMENTS

| | | | | |
|---|---|---|---|---|
| 3,956,540 A | * | 5/1976 | Laliberte et al. | |
| 4,836,960 A | * | 6/1989 | Spector et al. | |
| 4,900,242 A | * | 2/1990 | Maus et al. | |
| 4,933,119 A | * | 6/1990 | Weymouth, Jr. | |
| 5,337,880 A | * | 8/1994 | Claycomb et al. | |
| 5,597,609 A | * | 1/1997 | Beisswenger et al. | |
| 5,679,756 A | * | 10/1997 | Zhu et al. | |
| 5,750,060 A | * | 5/1998 | Maus et al. | |
| 5,750,156 A | * | 5/1998 | Maus et al. | |
| 6,008,296 A | * | 12/1999 | Yang et al. | |
| 6,015,512 A | * | 1/2000 | Yang et al. | |
| 6,033,718 A | * | 3/2000 | Marias Albrich et al. | |

* cited by examiner

Primary Examiner—Brenda A. Lamb
(74) Attorney, Agent, or Firm—DeLio & Peterson, LLC

(57) ABSTRACT

A method and apparatus are provided for batch, continuous, or semi-continuous coating of optical lenses. The method and apparatus use a plurality of carriages which are reciprocally moved in the apparatus to transfer jigs from a jig filled carriage to a lens loading arm and to load the jigs with lenses and then to transfer the jigs now containing uncoated lenses to a leading empty carriage. Using such a reciprocating motion, a leading empty carriage is now filled with jigs containing uncoated lenses and the uncoated lenses in the carriage may then be coated by dipping the carriage in a coating tank. After coating, the coated lenses are removed from the system. A similar reciprocating motion is used in the coated lens unloading section.

4 Claims, 13 Drawing Sheets

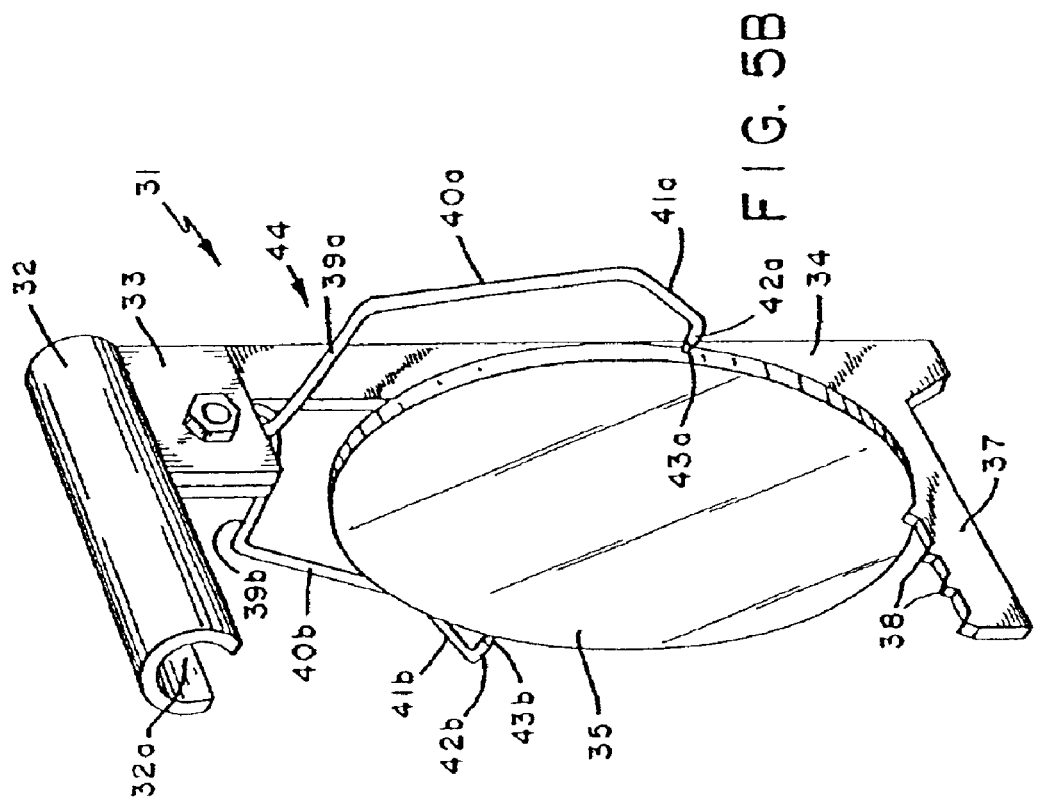
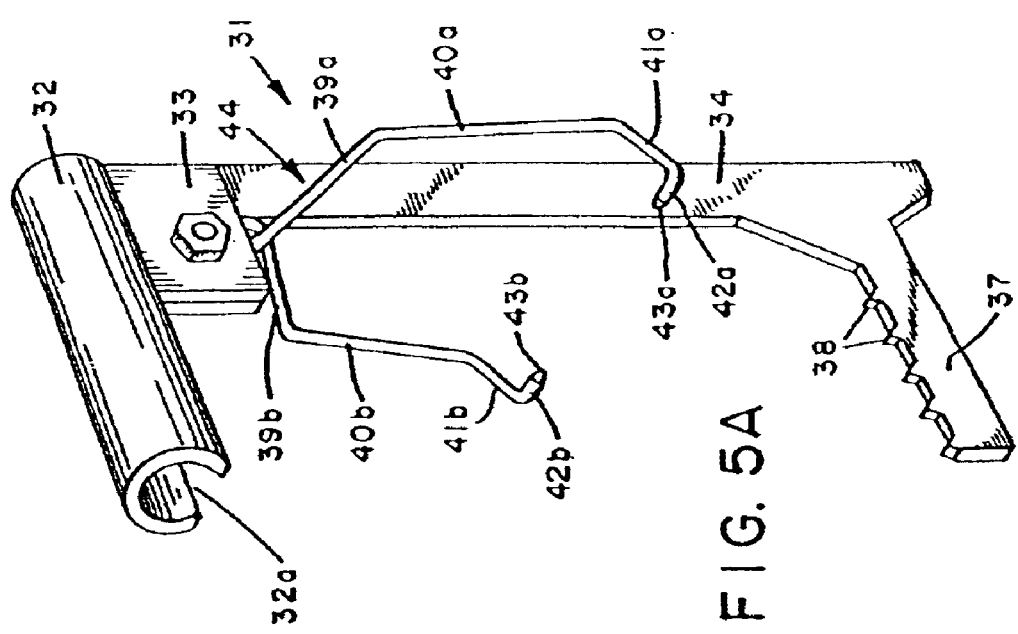

OPTICAL LENS COATING APPARATUS AND METHOD

BACKGROUND OF THE INVENTION

1. Field of the Invention

The present invention relates to optical articles such as ophthalmic lens and, in particular, to a method and apparatus for hard coating the optical article to increase the abrasion resistance and enhance other physical properties of the optical article. The invention provides a continuous or semi-continuous method and apparatus for hard coating optical articles which is efficient and cost-effective wherein two carriages at a time are reciprocated separately on a conveyor in uncoated lens loading and coated lens unloading sections to provide from the loading section a carriage full of uncoated lens ready for hard coating and from the unloading section a carriage full of jigs for holding lens which carriage is ready for transfer to the lens loading section.

2. Description of Related Art

Lenses are used for a wide variety of purposes such as microscopes and other optical instruments as well as ophthalmic lenses used for eye glasses. While the present invention involves a method and apparatus for hard coating any type optical articles or lenses, the following discussion will be directed for convenience to ophthalmic lenses.

Polymeric materials (e.g., plastics) have become the material of choice for ophthalmic lenses and have replaced the more traditional glass lenses for a number of reasons. Plastic is lighter than glass and there can be great reduction in the weight of the optical product. Plastics also may be provided in a wide range of fashionable colors and gradient-density tints and production techniques have improved so that plastic lenses can be manufactured at high rates and in a more automated fashion than glass lenses. Polymeric materials also offer great improvement over glass in terms of impact resistance and high refractive index. In general, plastic lenses are now the lenses of choice in the industry.

Plastic lenses may be manufactured in a variety of ways by individual casting techniques as well as injection molding processes. Regardless of the method of manufacture, however, the plastic lenses typically require a hard coating to increase the abrasion resistance of the plastic lens. The hard coating is typically applied by dipping the lens in a liquid hard coating solution and the coating is then cured by chemical cross-linking. U.S. Pat. No. 3,956,540 to Laliberte et al. entitled "Method of Coating Articles" is directed to a method and apparatus for applying a synthetic resin coating of predetermined thickness to ophthalmic lenses. Basically, the lenses are grouped and moved along a conveyor and are subjected to an ultrasonic cleaning. The cleaned lenses pass to a destaticizing station and then to a coating station where a dip tank is rapidly raised to immerse the lenses in the solution and the tank is then lowered at a controlled rate to provide a coating of the desired thickness on each lens in a single operation. The above patent is hereby incorporated by reference.

U.S. Pat. No. 5,750,060 to Maus et al. is directed to plastic injection-compression multi-cavity molding of flash-free improved-cleanliness thermoplastic spectacle lenses which are suitable to be robotically dip coated. A molded-on tab with each pair of lenses is specially suited for manipulation by a robot and the procedure produces micro-clean hard-coated paired molded lenses made entirely within a single continuous cleanroom air enclosure surrounding the lenses without any human operators therein. This patent is also incorporated herein by reference.

Regardless of the method used for making ophthalmic lenses and whether or not the lenses are single lenses or made together with tabs, there still exists a need for an automated cost-effective method for hard coating the lenses. The hard coating method and apparatus should be capable of being used with little or no human intervention and provide an efficient and reliable method for hard coating the lenses.

Bearing in mind the problems and deficiencies of the prior art, it is therefore an object of the present invention to provide a batch, semi-continuous and/or continuous method for hard coating optical articles such as ophthalmic lenses which method is cost-effective and reliable and may be automated so that little or no human intervention is required.

It is another object of the present invention to provide an apparatus for batch, continuous and/or semi-continuous hard coating of optical articles such as ophthalmic lenses which apparatus is cost-effective and reliable and requires little or no human intervention to operate the apparatus.

In another object of the invention hard coated optical articles such as opthalmic lenses made using the method and apparatus of the invention are also provided.

Still other objects and advantages of the invention will in part be obvious and will in part be apparent from the specification.

SUMMARY OF THE INVENTION

This invention is directed in one aspect to a method and apparatus for hard coating ophthalmic lenses which is a sequential series of steps which steps may be employed together to form a completely automated and continuous method or which steps may be performed individually to provide a batch or semi-continuous method. Basically stated, a plurality of carriages for holding lenses are used which carriages move sequentially through the system. At one point in the method one or more of the carriages from an uncoated lens loading section contain uncoated lenses secured in jigs in the carriage. These carriages are then dip coated to form a coating on the jig secured lenses. Once coated, the carriage is moved to an unloading section in which the coated lenses are removed from the carriage and the carriage moved to the lens loading section. In the lens loading and unloading sections two carriages are used in sequence in a reciprocating motion as described hereinbelow.

In general, a plurality of carriages are moved through an uncoated lens loading section, a dip coating section, a coated lens unloading section and, then after the unloading section, the carriages are moved back to the uncoated lens loading section and the method repeated. The carriages may be moved through the system in any form such as on a conveyor and the carriage comprises a structure for holding a plurality of jigs in a front-to-back relationship and also preferably in a side-by-side relationship. Thus, a typical carriage will generally hold 6 jigs in a front-to-back relationship and 6 jigs in a side-by-side relationship. This provides a total of 36 jigs which may be held in each carriage. Each jig is capable of holding a single lens so that a total of 36 lenses may be held by jigs in each carriage. The carriages, while all the same structure, have different functions at different points in the method and apparatus and the carriages as they are used in the method an apparatus may be defined as follows:

1. A "filled jig carriage" means that the carriage is filled with jigs (without any lenses being secured in the jigs).

2. An "empty carriage" is a carriage which contains no jigs.
3. A "filled jig and uncoated lens carriage" means a carriage which contains uncoated lenses secured in jigs with the carriage being filled with jigs and secured uncoated lens to the desired carriage capacity.
4. A "filled jig and coated lens carriage" means a carriage which contains coated lenses secured in jigs with the carriage being filled with jigs and secured coated lens to the desired carriage capacity.

It is an important feature of the invention that the method and apparatus of the invention employ a leading empty carriage preceded by a filled jig carriage or a filled jig and coated lens carriage. In an uncoated lens loading section of the apparatus which employs an uncoated lens loading arm and an uncoated lens input conveyor or other lens loading device, a leading empty carriage is followed by a filled jig carriage. The filled jig carriage is moved adjacent the uncoated lens loading arm and the arm is manipulated to remove a single row of side-by-side jigs from the filled jig carriage. The filled jig carriage (which now contains one less row of jigs) is then moved back so that the empty carriage is now adjacent the uncoated lens loading arm. The uncoated lens loading arm is moved downward to the lens input conveyor and secures lenses in each of the jigs in the arm. The arm is then moved upward and the uncoated lens containing jigs are transferred to the empty carriage. The empty carriage (which now contains one row of lens containing jigs) is then moved forward with the filled jigs carriage and another row of jigs moved from the filled jig carriage (which is now adjacent the loading arm) to the uncoated lens loading arm. The filled jig carriage is then moved back with the empty carriage, lenses secured in the jigs and the jigs then transferred to the empty carriage (which contains one row of uncoated lens containing jigs from the previous step). This reciprocating process is repeated until the filled jig carriage is empty. At this point the empty carriage is now filled and is now a filled jig and uncoated lens carriage and the filled jig carriage is now an empty carriage. The filled jig and uncoated lens carriage is moved out of the uncoated lens loading section to a storage area or directly to a hard coating dip tank. Another filled jig carriage is then moved into the uncoated lens loading section so that there is a leading empty carriage (the previous filled jig carriage) followed by a filled jig carriage. The above loading procedure is repeated to load the empty carriage to form another filled jig and uncoated lens carriage.

A similar procedure is used in the coated lens unloading section in which a leading empty carriage is followed by a filled jig and coated lens carriage which carriage was formed when the filled jig and uncoated lens carriage was moved through the coating section to coat the lenses in the carriage. In the coated lens unloading section, the filled jig and coated lens carriage is moved adjacent a coated lens unloading arm and a single row of side-by-side jigs containing coated lenses removed to the coated lens unloading arm from the filled jig and coated lens carriage. The coated lens unloading arm is moved downward to the coated lens output conveyor and the lenses released from the jigs and the coated lenses removed from the system. The jigs remain on the coated lens unloading arm and this arm is moved upward. The filled jig and coated lens carriage is moved back with the empty carriage so that the empty carriage is now adjacent the coated lens unloading arm. The jigs in the coated lens unloading arm (which do not now contain coated lenses) are then loaded onto the empty carriage. The empty carriage is moved forward so that the filled jigs and coated lens carriage is now adjacent the coated lens unloading arm. The above procedure is repeated to remove another row of jigs and coated lenses from the carriage which coated lenses are removed from the jigs and the system and the jigs then transferred to the empty carriage which is moved back adjacent the coated lens unloading arm. This procedure is repeated until all the coated lenses are removed. At this point, the empty carriage is now a filled jig carriage which is moved in the system to the uncoated lens loading section. The filled jig and coated lens carriage is now empty and will be used as described above with a preceding filled jig and coated lens carriage to remove coated lenses from the system and to fill jigs into the empty carriage to form a filled jig carriage.

As can be seen from the above, it is an important feature of the invention that a plurality of carriages be used in sequence which carriages hold either jigs, are empty, are filled with jigs and uncoated lenses secured in the jigs or filled with jigs containing secured coated lenses. As described above, during operation of the method and apparatus of the invention what is held in each carriage during loading and unloading steps is changing. The system uses a reciprocating motion in the uncoated lens loading section and the coated lens unloading section to either load lenses onto jigs in carriages in the lens loading section or to unload coated lenses from the system in the coated lens unloading section. It will be appreciated that each of the above operations whether the loading of lenses, the coating of lenses contained in carriages, or the unloading of coated lenses from the carriages may be performed individually to provide batch or a semi-continuous method and apparatus or in sequence so that a complete automated continuing method and apparatus may be used.

In another aspect of the invention a continuous method is provided for coating optical lenses comprising the steps of:
(a) providing a leading first empty carriage and preceding second empty carriage, each carriage adapted to hold a plurality of jigs containing lenses in a front-back arrangement, preferably also side-by-side, each jig adapted to hold a single lens;
(b) providing a plurality of preceding carriages each of which is filled with a plurality of jigs in a front-back arrangement, preferably also side-by-side, forming a filled jig carriage;
(c) providing an uncoated lens loading station including an uncoated lens loading arm, a lens supply, a coated lens unloading station, a coating tank, coated lens unloading arm and a coated lens removal system;
(d) positioning the filled jig carriage at the uncoated lens loading arm;
(e) removing the front side-by-side row of jigs from the filled jig carriage onto the uncoated lens loading arm;
(f) securing a lens from the lens supply in each jig in the uncoated lens loading arm forming a plurality of lens containing jigs;
(g) moving the filled jig carriage back with the second empty carriage so that the second empty carriage is in a position adjacent the uncoated lens loading arm and transferring each lens containing jig to the second empty carriage;
(h) repeating steps (d)-(g) until the filled jig carriage now is empty forming an empty carriage and the second empty carriage is full forming a filled jig and uncoated lens carriage;
(i) removing the filled jig and uncoated lens carriage from the uncoated lens loading station;

(j) coating the lenses in the filled jig and uncoated lens carriage in the coating tank forming a filled jig and coated lens carriage;

(k) moving the leading first empty carriage and filled jig and coated lens carriage to the coated lens unloading station;

(l) positioning the filled jig and coated lens carriage at the coated lens unloading arm;

(m) removing a front side-by-side row of jigs from the filled jig and coated lens carriage onto the coated lens unloading arm;

(n) removing the coated lenses from the jigs onto the coated lens removal system conveyor and removing the coated lenses from the system;

(o) moving the first empty carriage back with the filled jig and coated lens carriage so that the first empty carriage is positioned adjacent the coated lens unloading arm;

(p) transferring the jigs from the coated lens unloading arm to the first empty carriage;

(q) repeating steps (l)-(p) until the filled jig and coated lens carriage is empty forming an empty carriage and the first empty carriage is full forming a filled jig carriage;

(r) removing the filled jig carriage from the coated lens unloading section and repeating steps (l)-(p) to unload lenses from another filled jig and coated lens carriage; and (s) repeating the above steps until all the lenses are coated.

In another aspect of the invention a method is provided for coating optical lenses comprising the steps of:

(a) providing a leading first empty carriage, the carriage adapted to hold a plurality of jigs containing lenses in a front-back arrangement, preferably also side-by-side, each jig adapted to hold a single lens;

(b) providing a plurality of preceding carriages each of which is filled with a plurality of jigs in a front-back arrangement, preferably also side-by-side, forming a filled jig carriage;

(c) providing an uncoated lens loading station including an uncoated lens loading arm, a lens supply, a coated lens unloading station, a coating tank, coated lens unloading arm and a coated lens removal system;

(d) positioning the filled jig carriage at the uncoated lens loading arm;

(e) removing the front row of jigs from the filled jig carriage onto the uncoated lens loading arm;

(f) securing a lens from the lens supply in each jig in the uncoated lens loading arm forming a plurality of lens containing jigs;

(g) moving the filled jig carriage back so that the first empty carriage is in a position adjacent the uncoated lens loading arm and transferring each lens containing jig to the second empty carriage;

(h) repeating steps (d)-(g) until the filled jig carriage now is empty forming an empty carriage and the second empty carriage is full forming a filled jig and uncoated lens carriage;

(i) removing the filled jig and uncoated lens carriage from the uncoated lens loading station;

(j) coating the lenses in the filled jig and uncoated lens carriage in the coating tank forming a filled jig and coated lens carriage;

(k) moving a leading second empty carriage and filled jig and coated lens carriage to the coated lens unloading station;

(l) positioning the filled jig and coated lens carriage at the coated lens unloading arm;

(m) removing a front row of jigs from the filled jig and coated lens carriage onto the coated lens unloading arm;

(n) removing the coated lenses from the jigs onto the coated lens removal system conveyor and removing the coated lenses from the system;

(o) moving the second empty carriage back so that the second empty carriage is positioned adjacent the coated lens unloading arm;

(p) transferring the jigs to the second empty carriage;

(q) repeating steps (l)-(p) until the filled jig and coated lens carriage is empty forming an empty carriage and the second empty carriage is full forming a filled jig carriage;

(r) removing the filled jig carriage from the coated lens unloading section and repeating steps (l)-(p) to unload lenses from another filled jig and coated lens carriage; and (s) repeating the above steps until all the lenses are coated.

In another aspect of the invention an apparatus is provided for coating optical lenses comprising:

a filled jig carriage which contains jigs in a front-back and side-by-side configuration;

an empty carriage;

an uncoated lens loading station;

an uncoated lens loading arm;

an uncoated lens input means;

a coating section;

a coated lens unloading section;

a coated lens unloading arm;

a coated lens output means;

wherein a leading empty carriage and preceding filled jig carriage are positioned in the uncoated lens loading section with the filled jig carriage adjacent the uncoated lens loading arm wherein the uncoated lens loading arm removes a single front side-by-side row of jigs from the filled jig carriage, lenses from the lens input means (e.g., conveyor) are secured in the jigs and the filled jig carriage moved back so that the empty carriage is adjacent the uncoated lens loading arm and the lens containing jigs transferred to the empty carriage, with the above procedure being continued until the filled jig carriage is empty so that the empty carriage is now a filled jig and uncoated lens carriage which is moved out of the uncoated lens loading section and is dipped in the coating section; and wherein after coating the lenses in the filled jig and uncoated lens carriage the carriage is now a filled jig and coated lens carriage and is moved into the coated lens unloading section with a leading empty carriage, the filled jig and coated carriage is moved adjacent the coated lens unloading arm and a single front side-by-side row of jigs and coated lenses removed from the carriage with the lenses being removed from the jigs and removed from the system using the coated lens output means (e.g., conveyor), the filled jig and coated lens carriage is then being moved back so that the empty carriage is adjacent the coated lens unloading arm and the jigs transferred onto the empty carriage from the coated lens unloading arm with the above procedure being continued until the filled jig and coated lens carriage is empty so that the empty carriage is now a filled jig carriage and is moved out of the coated lens unloading section and is ready to be used in the uncoated lens loading section.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5A is a perspective view of a jig used in the method and apparatus of the invention to secure lenses therein.

FIG. 5B is the jig of FIG. 5A holding a lens therein.

DESCRIPTION OF THE PREFERRED EMBODIMENT(S)

Figure 1:
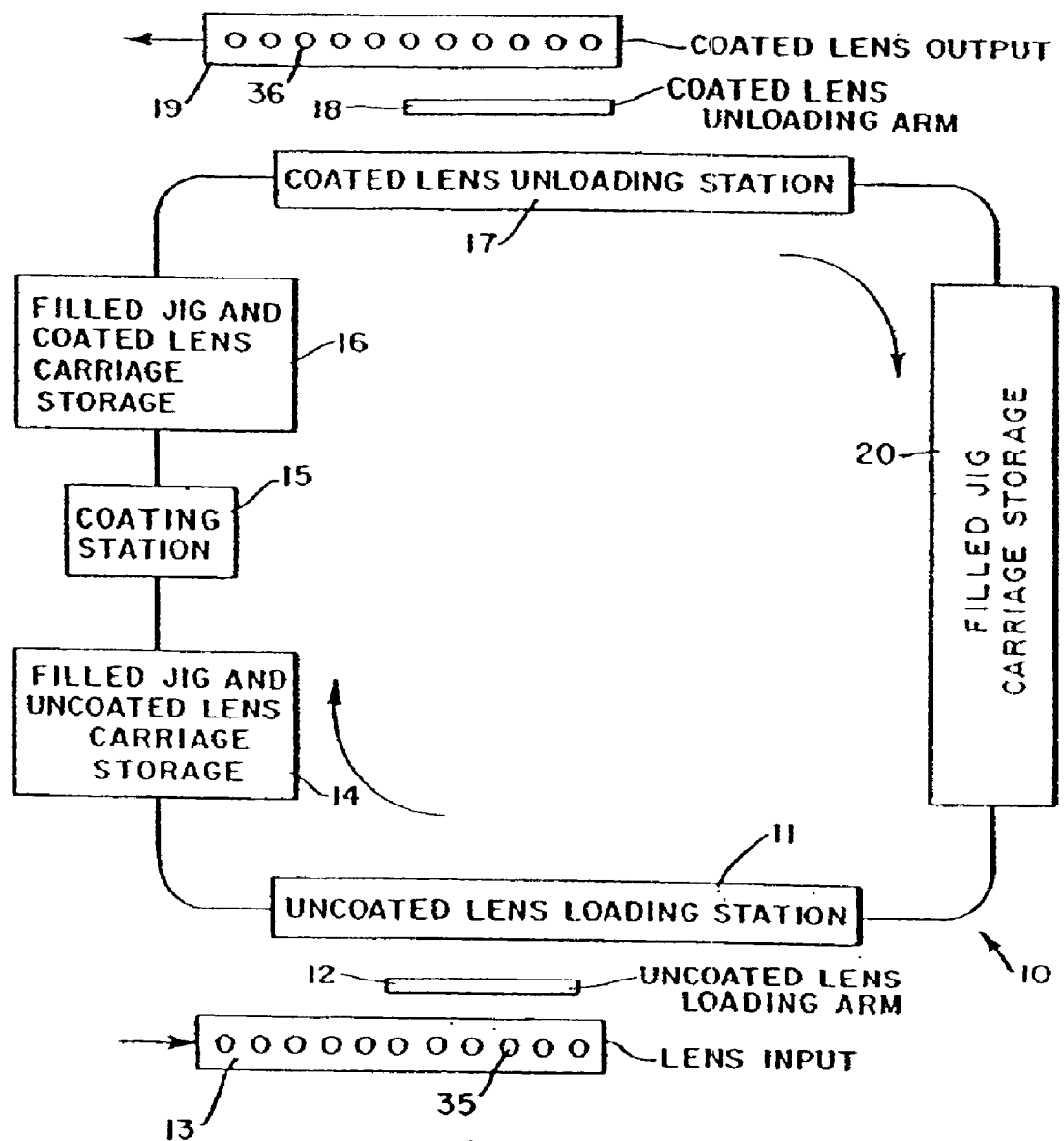
FIG. 1 is a schematic top plan view of an apparatus and method of the invention used to continuously coat optical lenses.

In describing the preferred embodiments of the present invention, reference will be made herein to FIGS. 1–7 of the drawings in which like numerals refer to like features of the invention. Features of the invention are not necessarily shown to scale in the drawings.

The method and apparatus of this invention is being described specifically for coating optical lenses but it will be appreciated by those skilled in the art that the method and apparatus may be used to coat other optical devices such as microscope lenses and the like. With regard to an optical lens, an optical lens is typically round or rectangular and the lens' width, height and thickness may vary as is well-known in the art. It is an important feature of the invention that a jig be used in which a single lens can be secured therein and held by the jig. The jigs are used in conjunction with two carriages in reciprocating sequential motion and the use of either an uncoated lens loading arm or a coated lens unloading arm to move jigs and/or jigs containing lenses from one carriage to another carriage. It will also be described hereinbelow how the use of two carriages in reciprocating sequential motion with an uncoated lens loading arm or coated lens unloading arm enables loading lenses into the system for coating and/or unloading coated lenses from the system.

Referring first to FIG. 1, a schematic of the broad aspects of the method and apparatus of the invention can be seen. The method and apparatus shown generally as 10 comprises an uncoated lens loading section 11, an uncoated lens loading arm 12 and a lens input conveyor 13 on which uncoated lenses 35 are moved in the apparatus. Two carriages, a leading empty carriage and a preceding filled jig carriage (not shown in FIG. 1 but shown in FIG. 2) are reciprocally moved in uncoated lens loading section 11 which movement in conjunction with uncoated lens loading arm 12 enables transferring uncoated lenses 35 from the lens input conveyor 13 into jigs which secure each lens and which jigs are transferred to the empty carriage to move lenses through the apparatus. After loading uncoated lenses 35 onto an empty carriage is completed, the now filled jig and uncoated lens carriage is moved out of uncoated lens carriage loading section 11 and may be moved to a filled jig and uncoated lens carriage storage 14 or directly to a coating section 15. After coating, the filled jig and uncoated lens carriage is now a filled jig and coated lens carriage which may be stored in filled jig and coated lens carriage storage 16 or moved directly into coated lens unloading section 17.

The carriage will have a leading empty carriage and again, using a reciprocating motion, the jigs with their secured coated lenses 36 will be removed from the filled jig and coated carriage by the coated lens unloading arm 18, the coated lens 36 removed from the jigs and the coated lenses moved out of the apparatus using coated lens removal conveyor 19. The jig and coated lens carriage is now moved back and the empty jigs now remaining in the coated lens unloading arm will be moved to the empty carriage which is now adjacent the coated lens unloading arm. Following such a reciprocating motion this procedure is continued until all the jigs and coated lenses are removed from the filled jig and coated lens carriage. When this procedure is finished the leading empty carriage will now be a filled jig carriage and moved out of coated lens unloading section 17 into filled jig carriage storage 20 or directly into uncoated lens carriage loading section 11. The filled jig and coated lens carriage will now be a leading empty carriage for use to remove lens in the coated lens unloading section as described above.

It will be appreciated that the method and apparatus shown in FIG. 1 may be used in a continuous loop as shown to provide both loading of uncoated lenses into the apparatus and the unloading of coated lenses from the apparatus. Likewise, each section can be operated individually in a batch or semi-continuously and the carriages stored for further operation such as in filled jig and uncoated lens carriage storage 14, in preparation for coating in section 15 and then storage of the filled jig and coated lens carriage in storage 16 before coated lens unloading from the apparatus.

Figure 2:
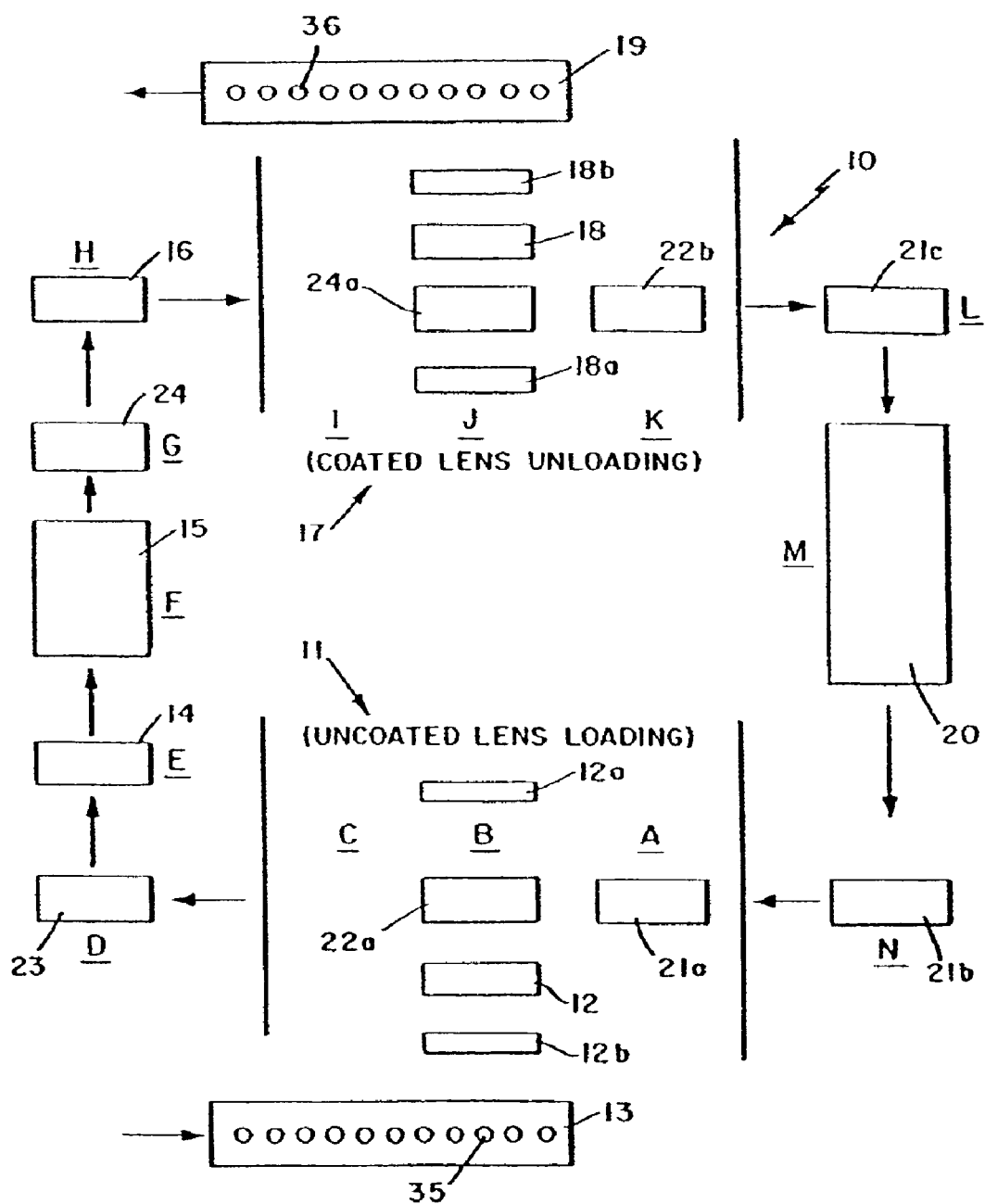
FIG. 2 is a schematic top plan view of an apparatus and method of the invention used to coat optical lenses showing in detail operation of the apparatus and method to load uncoated lenses into the apparatus for coating and unloading of the coated lenses from the apparatus.

Referring now to FIG. 2, movement of lenses, jigs and carriages and the reciprocating movement of the carriages may be seen in the uncoated lens carriage loading section 11 and coated lens unloading section 17. Thus, in uncoated lens carriage loading section 11, an empty carriage 22a is shown in position B in section 11. In preceding position A, a filled jig carriage is shown as 21a. By using a reciprocating motion between locations A, B and C within section 11, the jigs in filled jig carriage 21a may be secured with lenses and the jigs with lenses transferred to empty carriage 22a. Thus, filled jig carriage 21a is moved from location A to location B so that empty carriage 22a is then moved to location C. The uncoated lens loading arm 12 removes jigs from filled jig carriage 21a and by a preferred downward arc movement of the arm to lens input conveyor 13, lenses 35 are loaded onto the jigs. Filled jig carriage 21a is moved back to location A and empty carriage 22a to location B and the arm moved upward. The lens containing jigs are then transferred from loading arm 12 to empty carriage 22a. Jig pushers or aligners 12a and 12b are used in conjunction with uncoated lens loading arm 12 to push the transferred jig containing lenses onto carriage 22a or the jigs from carriage 21a onto uncoated lens loading arm 12. The above procedure is continued until the empty carriage 22a is filled becoming a filled jig and uncoated lens carriage shown as numeral 23 which is moved to location D. The previously filled jig carriage 21a now becomes empty carriage 22a and is moved to location B. From location N a filled jig carriage 21b is moved to location A so that in uncoated lens loading section an empty carriage 22a leads a filled jig carriage 21a which carriages are then ready for loading uncoated lenses onto the empty carriage 22a.

From location D, the filled jig and uncoated lens carriage may be moved to filled jig and uncoated lens carriage storage 14 at location E or moved directly into the coating section 15 at location F. After coating, the filled jig and uncoated lens carriage 23 is now a filled jig and coated lens carriage 24 shown at location G. The carriage may be moved into storage 16 at location H or moved directly into coated lens unloading section 17 as a filled jig and coated lens carriage 24a. As can be seen, a leading empty carriage 22b is also in section 17. As with the lens loading section 11, using a reciprocating motion between locations I, J and K, the coated lenses 36 are removed from the apparatus using coated lens unloading arm 18 in conjunction with jig pushes 18a and 18b as described above for jig pushes 12a and 12b. Thus, a filled jig and coated lens carriage 24a is positioned adjacent coating lens unloading arm 18 and a single row of jigs containing lenses removed by the arm 18 to the conveyor 19, the lenses separated from the jigs and the coated lenses 36 removed from the apparatus by conveyor 19. At this point, the filled jig and coated lens carriage 24a is moved back to position I positioning empty carriage 22b at location J opposite coated lens unloading arm 18. The empty jigs in the unloading arm 18 are then transferred to the empty carriage 22b and the reciprocating procedure continues until the empty carriage 22b is full of jigs and the preceding filled jig and coated lens carriage 24a is empty. Thus, the empty carriage 22b is now a filled jig carriage which is moved to location L and shown as numeral 21c. The filled jig carriage 21c may be stored in filled jig carriage storage 20 at position M or moved to location N and which carriage is ready for entry into uncoated lens carriage loading section 11.

As can be seen in FIG. 2, a reciprocating motion using a leading empty carriage 22a and preceding filled jig carriage 21a in uncoated lens carriage loading section 11 or a leading empty carriage 22b and a preceding filled jig and coated lens carriage 24a in coated lens unloading section 17 in conjunction with a loading/unloading arm provides a continuous method and apparatus for coating lenses wherein uncoated lenses are continually loaded into the system and coated lenses continually unloaded from the system. It should be appreciated however, that each of the above operations may be performed individually (batch or semi-continuously) and the resulting carriages stored for further processing before the next operation.

Figure 3A:
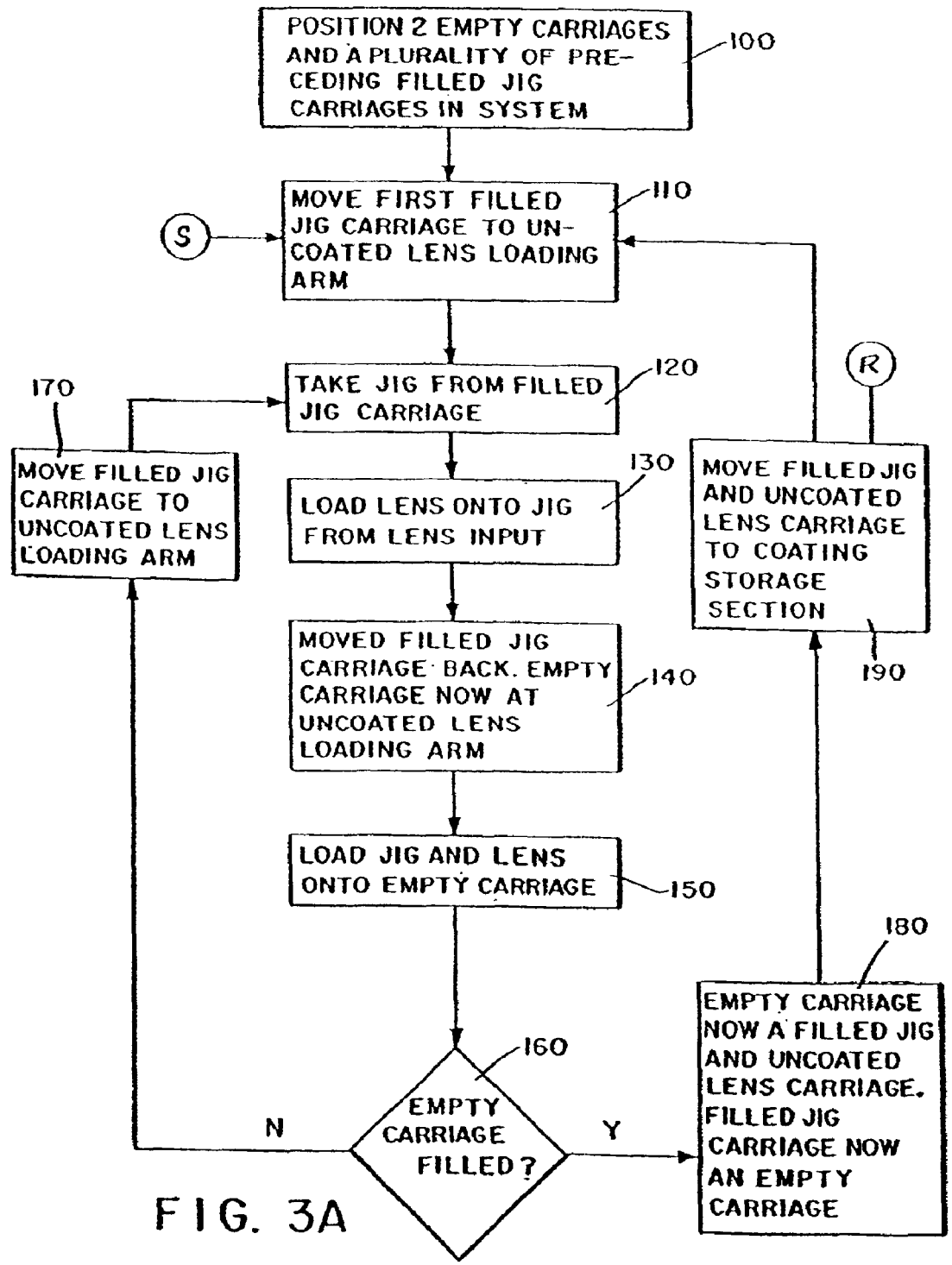
FIG. 3A is a flow sheet of a method of the invention used to coat optical lenses showing the uncoated lens loading system.

Referring now to FIG. 3A, a flow diagram is shown of the uncoated lens carriage loading section. In step 100, two empty carriages and a plurality of preceding filled jig carriages are sequenced in the method and apparatus. For a batch or semi-continuous method, only one leading empty carriage and preceding filled jig carriage are needed. In step 110 a first filled jig carriage is moved to the uncoated lens loading arm. Jigs are taken from the filled jig carriage in step 120 and lenses loaded onto the jigs from the lens input conveyor in step 130. The filled jig carriage is moved back and a leading empty carriage is now at the uncoated lens loading arm as shown in step 140. The jigs and lenses secured in the jigs are then loaded from the loading arm onto the empty carriage in step 150. A check is then made to see if the empty carriage is filled in step 160 and, if not filled, the filled jig carriage is moved to the uncoated lens loading arm in step 170 and the procedure repeated starting at step 120.

When the empty carriage is filled as indicated in step 160, the empty carriage is now a filled jig and uncoated lens carriage and the filled jig carriage is now an empty carriage as shown in step 180. The filled jig and uncoated lens carriage is then moved from the uncoated lens carriage loading section in step 190 to the coating storage section (R) and the process in the uncoated lens carriage loading system to load more lens into the apparatus continued at step 110.

Figure 3B:
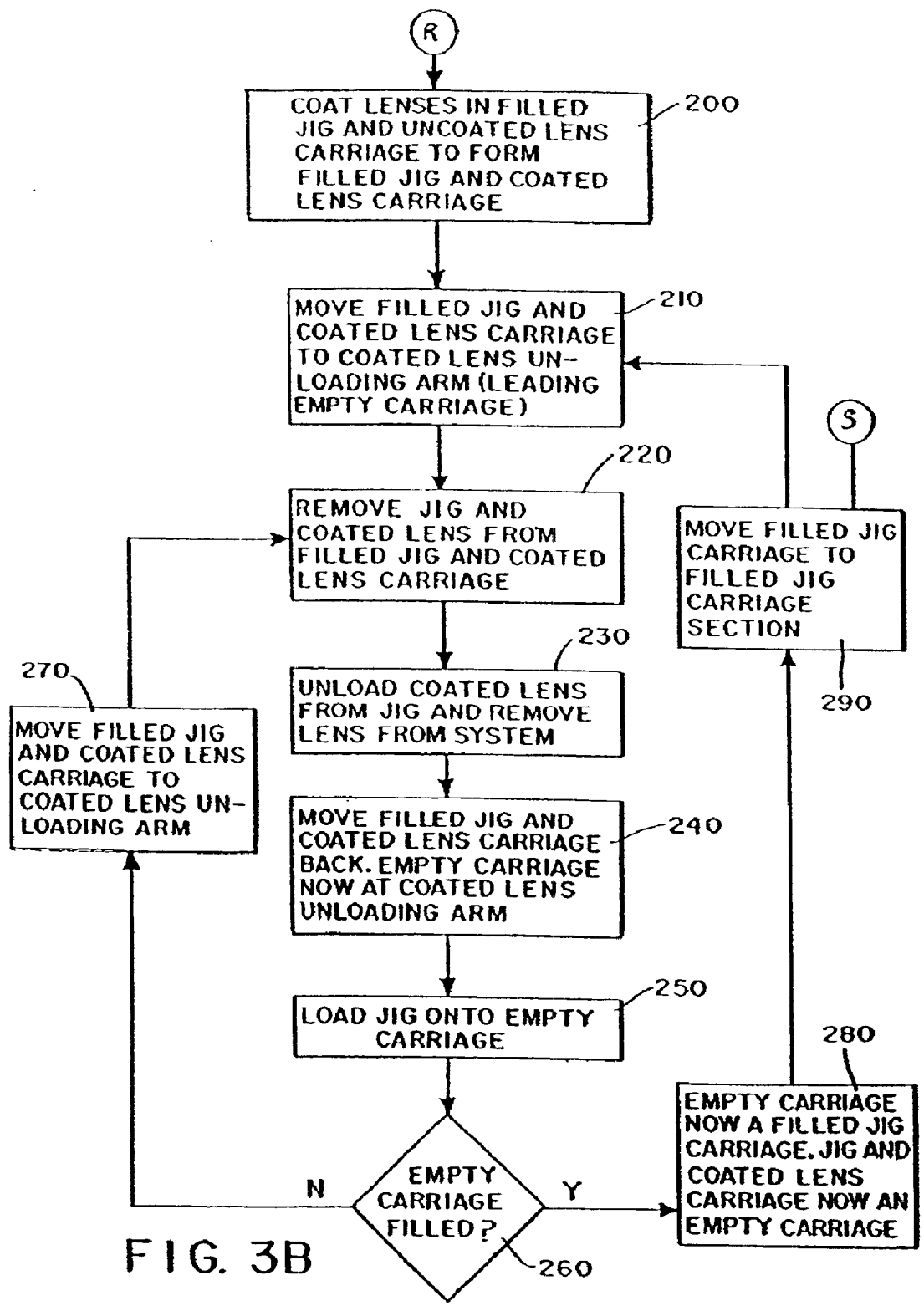
FIG. 3B is a flow sheet of a method of the invention used to coat optical lenses showing the coated lens unloading system.

Referring now to FIG. 3B, the filled jigs and uncoated lens carriage is moved from R to step 200 and the lenses coated by, e.g., dipping the carriage in a coating tank. This forms a filled jig and coated lens carriage. The filled jig and coated lens carriage is then moved to the coated lens unloading arm with a leading empty carriage in step 210. Jigs and secured coated lenses therein are removed from the filled jig and coated lens carriage in step 220 and the coated lenses removed from the jigs and the coated lenses removed from the system in step 230. The filled jig and coated lens carriage is moved back positioning the leading empty carriage at coated lens unloading arm in step 240. The jigs are loaded from the arm onto the empty carriage in step 250. In step 260 it is determined whether the empty carriage is filled. If it is not filled, the filled jig and coated lens carriage is moved to the coated lens unloading arm in step 270 and the process continues in step 220. If the empty carriage is filled, the empty carriage is now a filled carriage and the jig and coated lens carriage is now an empty carriage as shown in step 280. The filled jig carriage is moved to the filled jig carriage section in step 290 (B). The filled jig carriage as shown in FIG. 3S may now be used as shown in FIG. 3A in step 110 for unloading of jigs from the filled jig carriage to secure lenses for loading into a leading empty carriage. Referring back to FIG. 3B, in step 290 the apparatus is ready to remove lenses from a new filled jig and coated lens carriage as shown starting in step 210 and the process repeated until all the lens desired are coated and unloaded.

Figure 4:
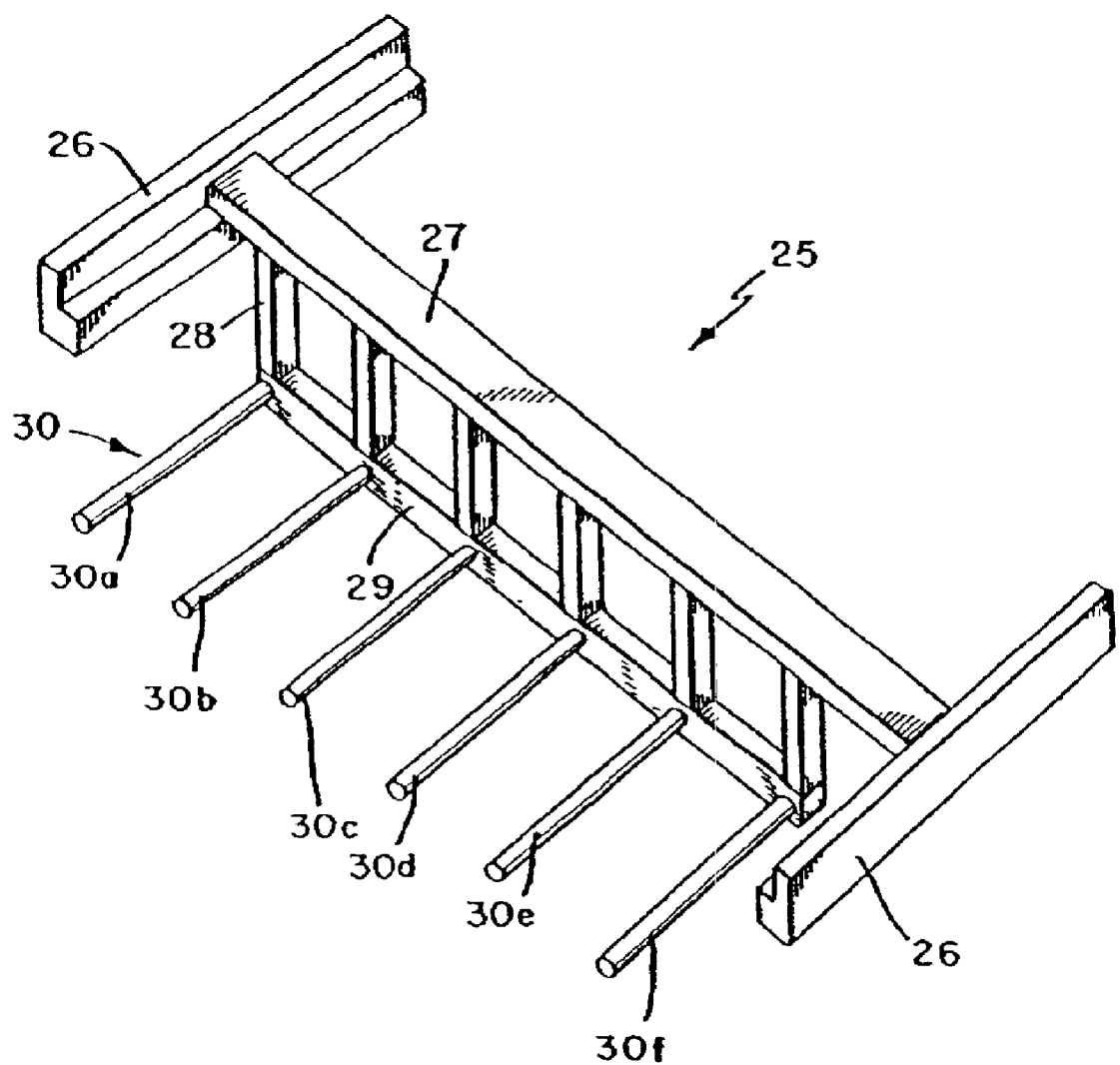
FIG. 4 is a perspective view of a carriage used in the method and apparatus of the invention.

Referring now to FIG. 4 a carriage used in the invention is shown. The carriage structure shown generally as 25 comprises two support arms 26, which are shown in an L shape, to support a cross-arm 27. The cross-arm 27 has a plurality of vertical hangers 28 ending in another second cross-arm 29. Extending outward, preferably transversely, from second cross-arm 29 are a plurality of jig holding arms 30. Six jig arms are shown as 30a–30f. The jig arms 30a–30f will support and hold a plurality of jigs as shown hereinbelow. The jigs, depending on the position of the carriage 25 in the apparatus, will be empty (not contain lenses) or will contain lenses secured in the jigs. As can be seen from FIG. 4, the jig arms 30a–30f extend outward from the second cross-arm 29 and are sized to fit a number of jigs on each arm in an abutting front-to-back relationship. Also, since there are a plurality of jig arms 30a–30f, the jigs are also positioned on the carriage 25 in a side-by-side relationship. Depending on the length of the jig arms 30a–30f and the size of the jig as discussed hereinbelow, will determine how many jigs can be held by each carriage. The jig arms

30*a*–30*f* will generally be in a rod shape so that a jig having a communicating sleeve will fit over the jig arm and slide thereon. The carriage 25 will be used with any suitable conveyor system to support the carriage 25 and to move the carriage through the apparatus as described hereinabove.

Referring now to FIG. 5A a jig used in the invention is shown. The jig shown generally as 31 comprises a sleeve 32, preferably cylindrical, having a through opening 32*a*. The jig sleeve 32 and through opening 32*a* are used to slide over the jig arms 30*a*–30*f* as shown in FIG. 4 and also over the unloading/loading arm as described hereinbelow. The jig has a vertical plate 33 extending from the bottom of the sleeve and a connected second vertical plate 34 in an L shape wherein the leg bottom 37 of the L extends in the same plane as the sleeve 32. The leg 37 at the bottom of plate 34 is serrated 38 for securely holding the lens 35 in the jig as shown in FIG. 5B. Attached to vertical plate 33 is a U-shaped spring 44 which is used to hold or secure the lenses with the extending leg 37 and serrated edges 38. The U-shaped spring 44 comprises outwardly extending opposed angled spaced arms 39*a* and 39*b*, vertical legs 40*a* and 40*b* and transversely extending arms 41*a* and 41*b* each terminating in inward transverse arms 42*a* and 42*b* with the free ends thereof being pointed as shown at 43*a* and 43*b*. FIG. 5B shows the U-shaped spring being spread apart and holding an uncoated lens 35 in the jig by a spring action.

Referring back to FIG. 4 in conjunction with FIGS. 5A and 5B, in operation the sleeve 32 of jig 31 would fit and slide over the jig arms 30*a*–30*f* of carriage 25. The length of sleeve 32 and the length of jig arms 30*a*–30*f* will determine the number of jigs which can be held on each jig arm 30*a*–30*f*. Typically there will be about 6 to 8 jigs held on each arm. As shown in FIG. 4, there are 6 jig arms 30*a*–30*f* which means that if the carriage 25 is full, a total of 36 jigs can be carried on carriage 25 (six deep by six across). As discussed above, jig pushing mechanisms are used in conjunction with the unloading and loading arm of the apparatus to push the jig onto or off the jig arms 30*a*–30*f* onto or off the loading/unloading arm depending on the operation. This will be described further hereinbelow. The jigs are loaded onto the jig arms 30*a*–30*f* so that the jigs are in an abutting relationship.

Referring now to FIGS. 6A–6F, the operation of the uncoated lens loading section 11 will be shown in detail. Carriages shown generally as numeral 25 are now shown individually as a filled jig carriage 21*a* and a leading empty carriage 22*a*. These are the carriages which will be unloaded and loaded as discussed hereinbelow. Supports 54 are shown supporting the carriages. A conveyor or other device could also suitably be employed.

Figure 6A:
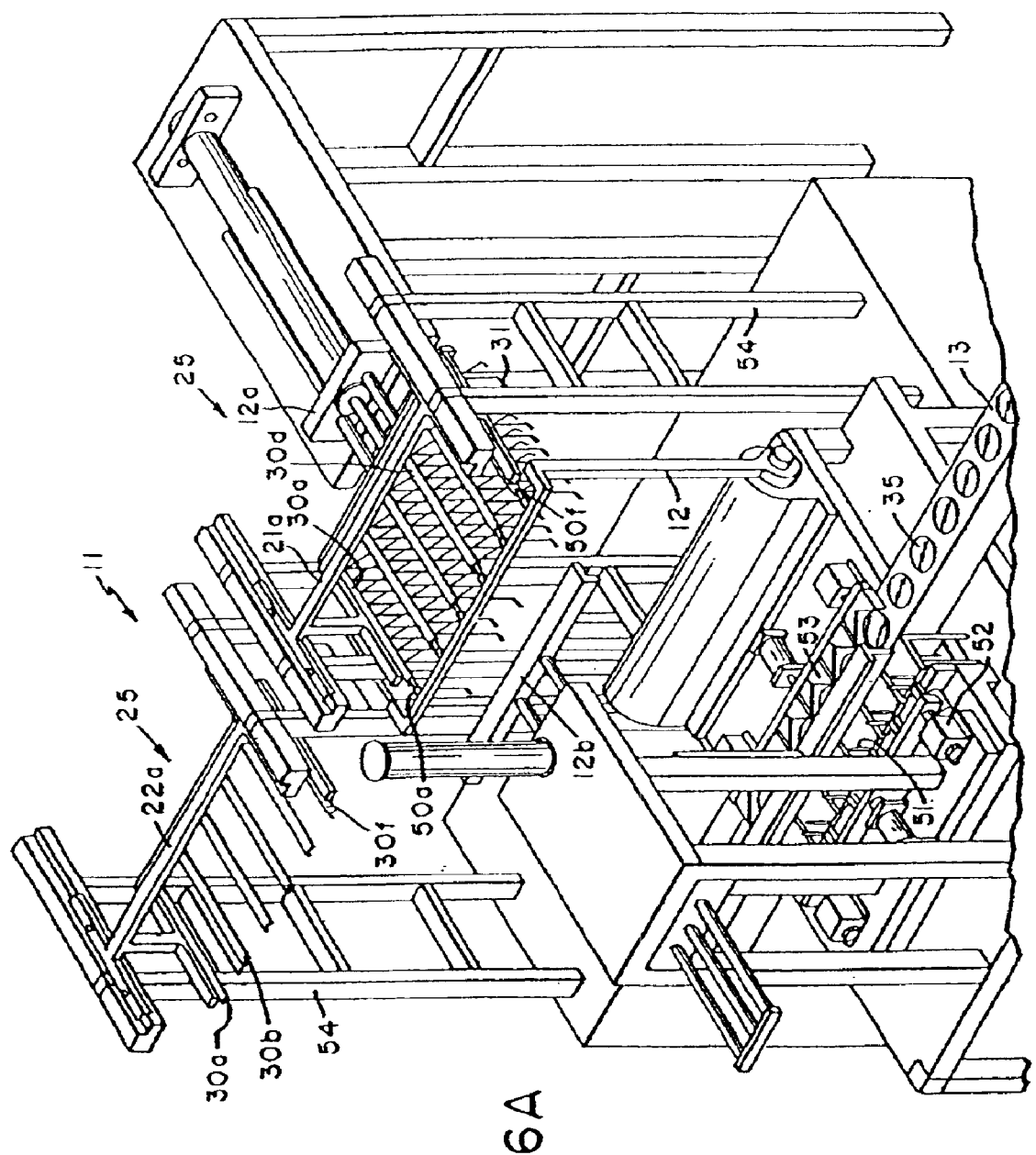
FIGS. 6A–6F are perspective views of the uncoated lens loading section of the invention including the uncoated lens loading arm and lens input conveyor showing, in sequence, operation of the method and apparatus of the invention.

In FIG. 6A, filled jig carriage 21*a* is completely full with jigs 31 in side-by-side and front-to-back relationship and is in position adjacent vertically positioned uncoated lens loading arm 12. The uncoated lens loading arm 12 is in an upright position and the arms 50*a*–50*f* of uncoated lens loading arm 12 are adjacent and in the same plane as the arms 30*a*–30*f* of carriage 21*a*. At this position pusher 12*a* moves toward carriage 21*a* and pushes the jigs 31 from the respective jig arms 30*a*–30*f* onto the jig arms 50*a*–50*f* of uncoated lens loading arm 12. Only one row of jigs is transferred to the loading arm because the arms 50*a*–50*f* of the loading arm are configured to accept only one row.

Also as shown in FIG. 6A, conveyor 13 has thereon a number of uncoated lenses 35 which are spaced to communicate with the arms 50*a*–50*f* of loading arm 12 and jigs 31. Jig spacer prongs 51 are used in conjunction with a turning mechanism 52 to communicate with the arms of jigs 31 to either open the arm of the jigs to accommodate an uncoated lens or to release pressure on the jig arms so that the lens will be secured by the tension of the jig arms. Empty carriage 22*a* is shown to the left of filled jig carriage 21*a*. Empty carriage 22*a* likewise has carriage arms 30*a*–30*f* which are to be used to receive jigs and uncoated lenses secured in the jigs. A pusher 12*b* is shown which is used to push jigs containing uncoated lenses onto the carriage arms 30*a*–30*f* of empty carriage 22*a* from loading arm 12 as described hereinbelow.

Figure 6B:
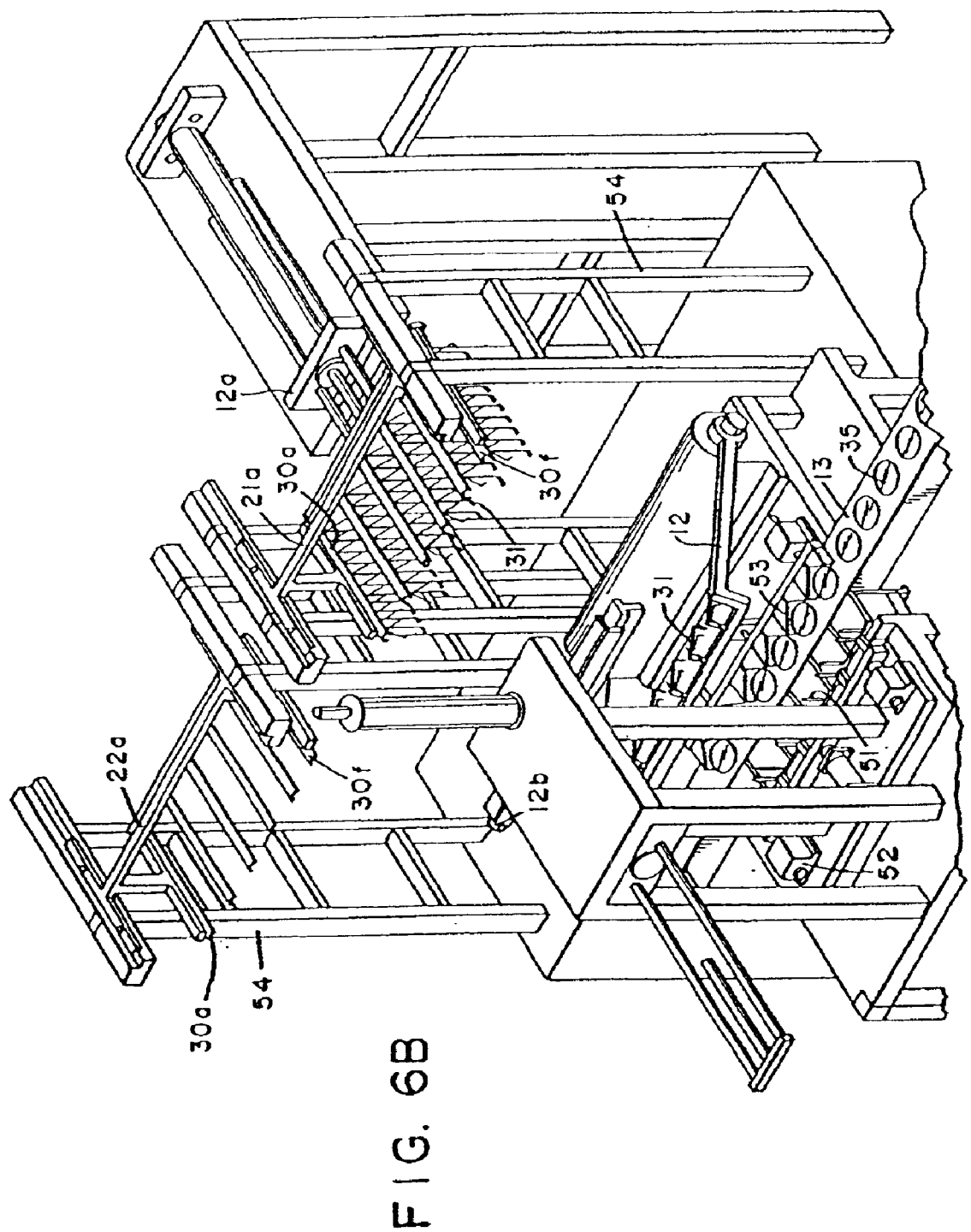

Referring now to FIG. 6B, uncoated lens loading arm 12 now containing one row of empty jigs 31 is revolved and moved downward toward conveyor 13. Lens pushers 53 are used to push the lens 35 into position for being secured in the jigs.

Figure 6C:
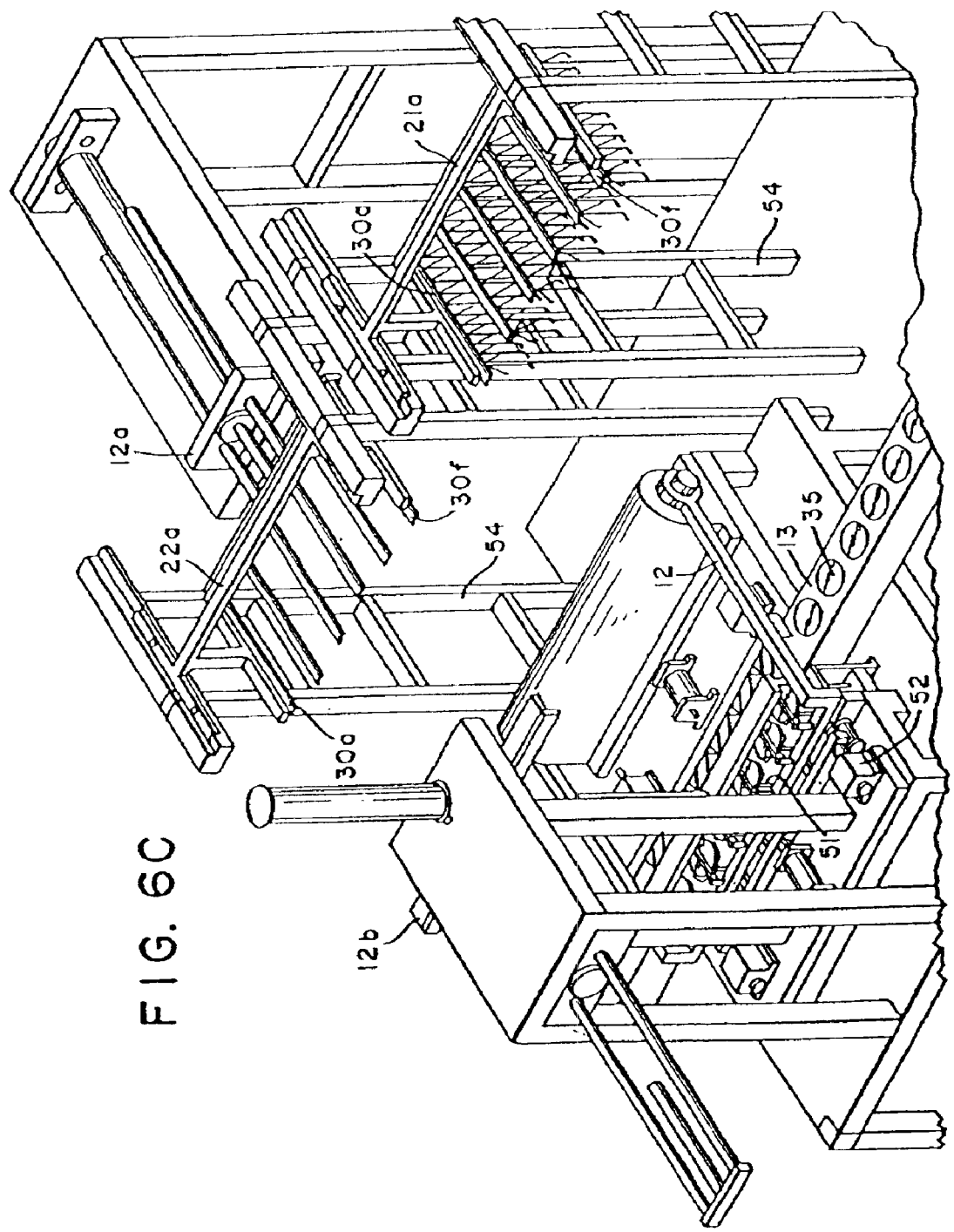

Referring now to FIG. 6C, uncoated lens loading arm 12 is moved completely downward (typically 90°) so that the jigs secured on the loading arms 50*a*–50*f* are in position to receive lenses 35. At this point, turning mechanism 52 is activated to open the jig spacer prongs 51 so that the arms of the jigs 31 are spread apart. The lenses are then pushed by lens pusher 53 into position and turning mechanism 52 deactivated to release the pressure on the jig spacer prongs so as to close the jig spacer prongs securing the lenses in each of the respective jigs 31. As can also be seen from FIG. 6C, filled jig carriage 21*a* is moved to the right and empty carriage 22*a* likewise moved to the right to be in position adjacent loading arm 12 when it is moved upward.

Figure 6D:
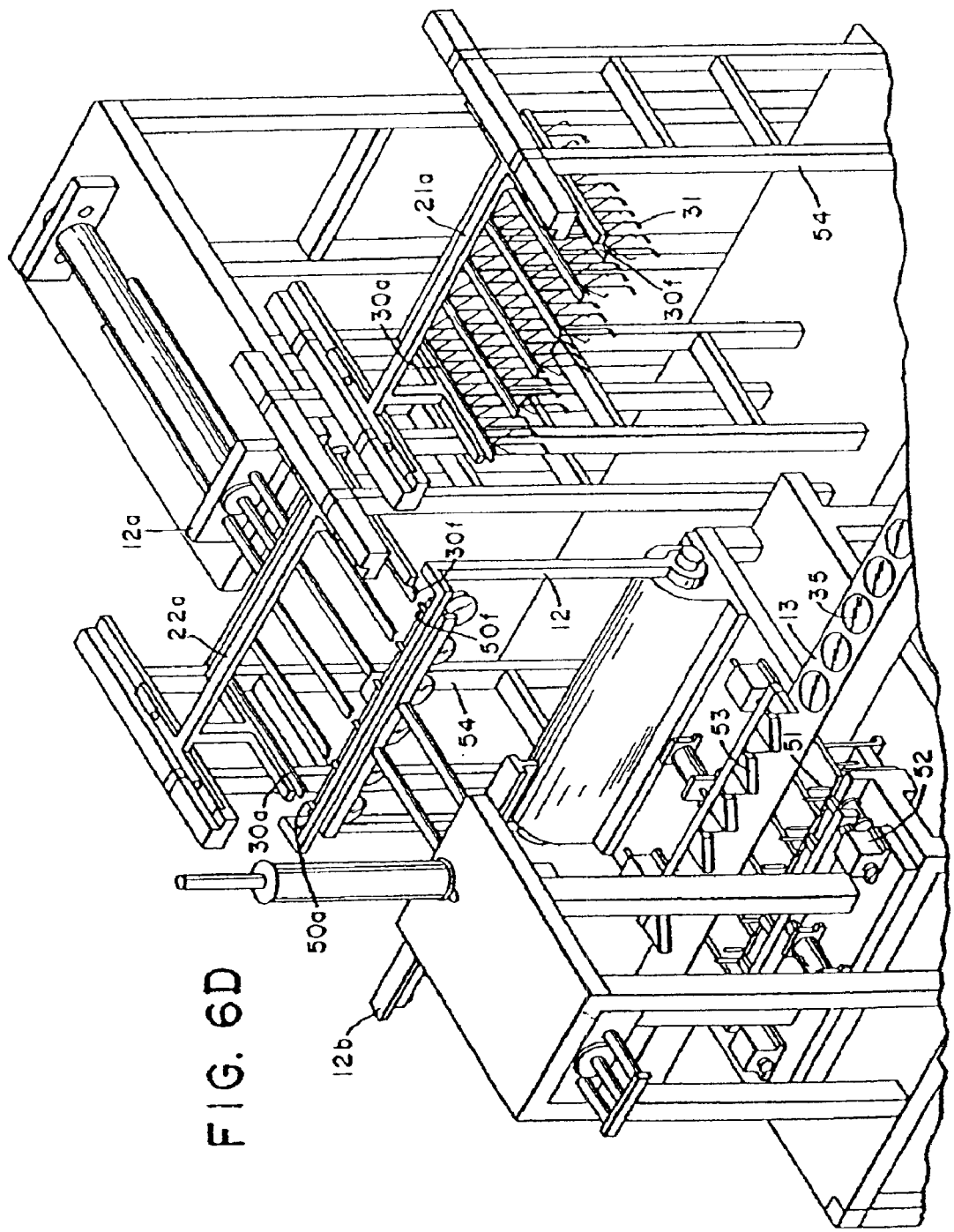

Referring now to FIG. 6D, loading arm 12 is moved upward so that it is now adjacent jig arms 30*a*–30*f* of empty carriage 22*a*. Arms 50*a*–50*f* of loading arm 12 are also adjacent arms 30*a*–30*f* of empty carriage 22*a* and in the same plane as arms 30*a*–30*f*. Jig pusher 12*b* is then actuated to push the jigs containing uncoated lenses from loading arms 50*a*–50*f* onto arms 30*a*–30*f* of empty carriage 22*a*.

Once the jig secured lenses are moved onto empty carriage 22*a*, carriage 22*a* is moved to the left so that filled jig carriage 21*a* is now positioned adjacent loading arm 12.

The above sequence of steps would then be repeated as shown in FIGS. 6A–6D to remove all the jigs 31 from filled jig carriage 21*a*, the jigs loaded with lenses 35 and the lens containing jigs move onto empty carriage 22*a*.

Figure 6E:
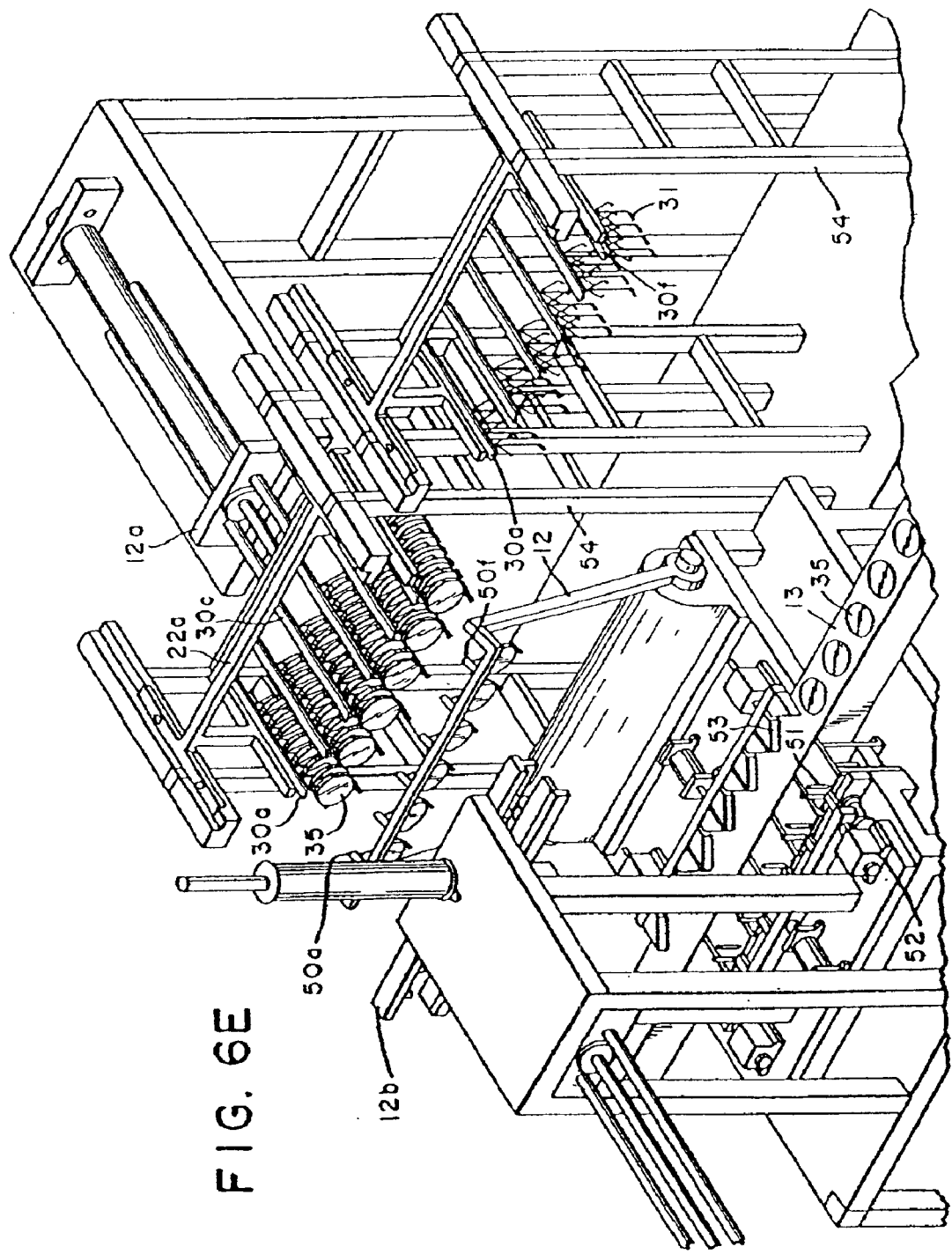

Referring to FIG. 6E, this figure shows the point in time during operation of the uncoated lens loading arm 12 procedure wherein a number of rows of jigs 31 have been removed from filled jig carriage 21*a* and have been filled with lenses 35 and loaded onto empty carriage 22*a*.

Figure 6F:
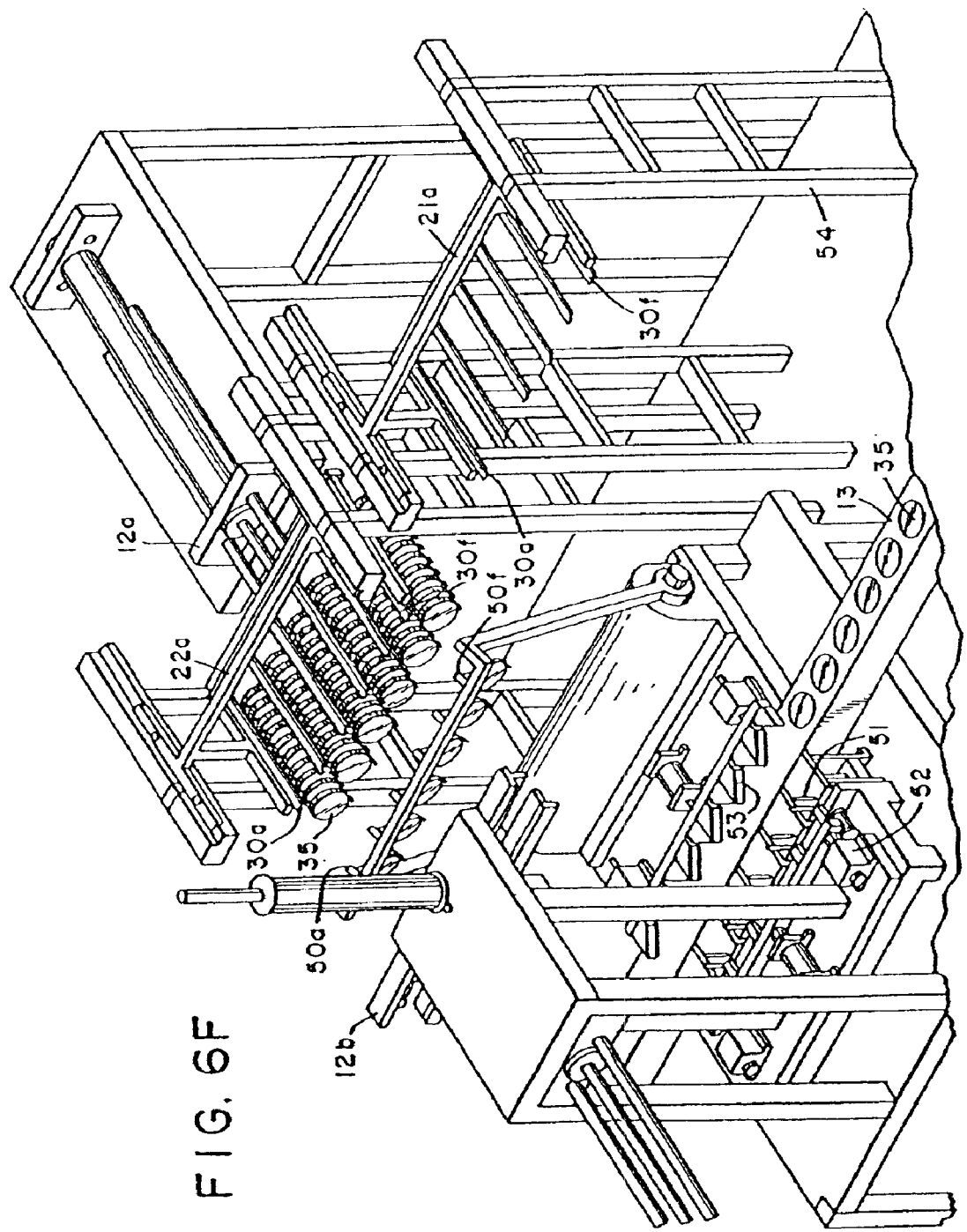

In FIG. 6F, completion of the lens loading procedure is shown wherein filled jig carriage 21*a* is now completely empty and empty carriage 22*a* is now completely filled with jigs containing uncoated lenses. At this point as shown in FIGS. 1 and 2, carriage 22*a* is now a filled jig and uncoated lens carriage and now termed 23 which is moved out of the loading system and the lenses ready for coating. Filled jig carriage 21*a* which is now empty is moved to the left and is now an empty carriage 22*a*. A new jig filled carriage is moved into the uncoated lens loading station 11 as jig filled carriage 21*a* and the procedure then continued as shown in FIGS. 6A–6D.

The above procedure is similar for the coated lens unloading section procedure as described in FIGS. 1 and 2.

Figure 7:
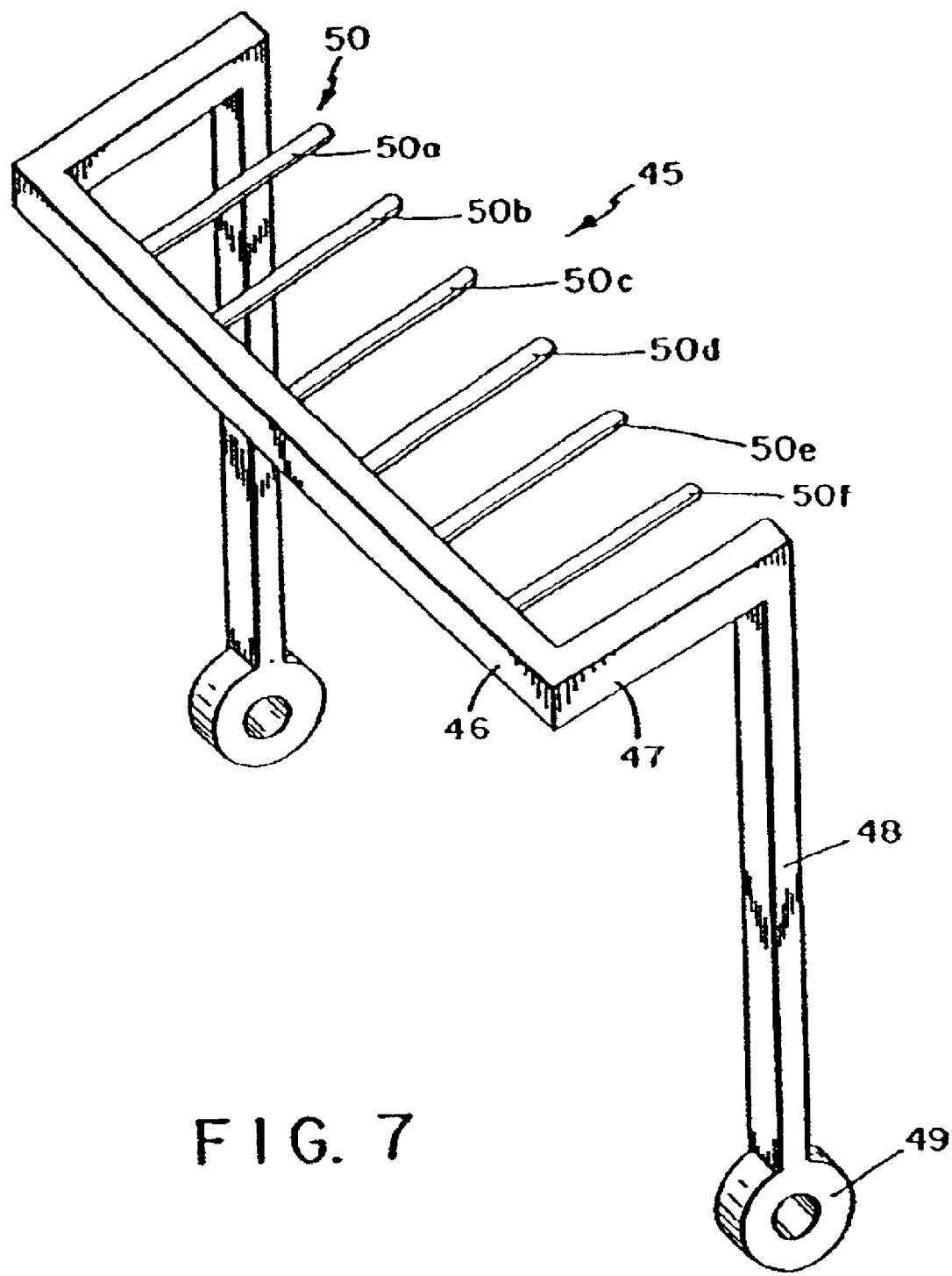
FIG. 7 is a perspective view of an uncoated lens loading arm of the invention.

Referring now to FIG. 7, an unloading or loading arm of the invention is shown generally as 45. It should be appreciated that the unloading arm and loading arm are essentially the same with their function being to transfer jigs with or without lenses from one carriage to another carriage. The unloading/loading arm comprises a horizontal cross-member 46 having two transverse members 47 and two vertical members 48. The vertical members 48 terminate in pivot members 49 which are used to move (rotate) the arm from one position to another position. For example, the arm in the vertical position will be used to either remove jigs from a carriage or transfer jigs to a carriage and in the downward (horizontal) position the arm is used to secure uncoated lenses or to remove coated lenses from jigs. A swinging motion is used to perform these functions through pivot point 49. Extending transversely from horizontal cross-arm 46 are jig arms shown generally as 50. There are 6 jig arms shown numbered 50a–50f. As described hereinabove, these jig arms are used in conjunction with the jig arms (30a–30f) of the carriage to transfer jigs from the loading/unloading arm to a carriage or vice versa.

The length of the jig arms 50a–50f is essentially the same length as the sleeve 32 of the jig shown in FIG. 5A. Thus, when a jig is removed from a carriage onto the unloading/loading arm 45 the jig sleeve 32 will fit over jig arm 50. Thus, only one jig is able to be positioned on each jig arm of the loading/unloading arm. Once the jigs are positioned on jig arms 50a–50f, depending on the operation, the jig arm is moved downward to either the uncoated lens loading conveyor or the coated lens unloading conveyor. For example, if we view the operation of loading an uncoated lens into the system, the jig filled carriage will be positioned opposite the loading arm 45 and a front row of jigs pushed from jig arms 30a–30f to corresponding jig arms 50a–50f of the loading arm. Once the jigs are positioned on jig arms 50a–50f, the loading arm is moved downward to the lens conveyor 13 as shown FIGS. 6A–6F to secure lenses 35 in each jig on the jig arms 50a–50f of loading arm 45. Once the lenses 35 are secured in the jigs, the loading arm 45 is moved back to a vertical position and the carriages moved back positioning the empty carriage now opposite loading arm 45. Jig pusher 12b then pushes the jigs now containing secured uncoated lenses from loading arm 45 jig arms 50a–50f onto their corresponding jig arms 30a–30f of carriage 25. The carriages are then moved forward and another set of empty jigs positioned onto jig arms 50a–50f of loading arm 45 from the jig arms of a jig filled carriage. The procedure is repeated until all the jigs are removed from the jig filled carriage, lenses secured in the jigs and the jig containing lenses transferred to the empty carriage.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for coating optical lenses comprising:
   a filled jig carriage which contains jigs in a front-back and side-by-side configuration;
   an empty carriage;
   an uncoated lens loading station;
   an uncoated lens loading arm;
   an uncoated lens input means;
   a coating section; and
   wherein a leading empty carriage and preceding filled jig carriage are positioned in the uncoated lens loading section with the filled jig carriage adjacent the uncoated lens loading arm wherein the uncoated lens loading arm removes a single front side-by-side row of jigs from the filled jig carriage, lenses from the lens input means are secured in the jigs and the filled jig carriage moved back so that the empty carriage is adjacent the uncoated lens loading arm and the lens containing jigs transferred to the empty carriage, with the above steps being continued until the filled jig carriage is empty thereby resulting in a new empty carriage and the former empty carriage is now a filled jig and uncoated lens carriage which is moved out of the uncoated lens loading section and is dipped in the coating section.

2. The apparatus of claim 1 wherein the carriage comprises two support arms, a connected cross-arm and a plurality of vertical hangers ending in a second cross-arm having a plurality of jig holding arms extending transversely therefrom.

3. The apparatus of claim 2 wherein the jig comprises a sleeve to fit over the jig holding arms, a vertical plate extending from the bottom of the sleeve in an L-shape wherein the bottom of the L-shape extends in the same plane as the sleeve and is serrated for holding a lens and a U-shaped spring attached to the vertical plate for holding a lens in conjunction with the serrated leg.

4. The apparatus of claim 1 wherein the uncoated lens loading arm comprises a horizontal cross member having two transverse members and two vertical members, with the vertical members terminating on pivot members which are used to rotate the arm from one position to another position and a plurality of transverse jig arms extending transversely from the horizontal cross-member, the jig arms holding the jigs.

* * * * *